US008189497B2

(12) United States Patent
Fuhrmann et al.

(10) Patent No.: US 8,189,497 B2
(45) Date of Patent: May 29, 2012

(54) ERROR DETECTION AND SUPPRESSION IN A TDMA-BASED NETWORK NODE

(75) Inventors: Peter Fuhrmann, Aachen (DE);
Manfred Zinke, Aachen (DE)

(73) Assignee: NXP B.V., Eindhoven (NL)

( * ) Notice: Subject to any disclaimer, the term of this patent is extended or adjusted under 35 U.S.C. 154(b) by 1319 days.

(21) Appl. No.: 10/555,266

(22) PCT Filed: Apr. 28, 2004

(86) PCT No.: PCT/IB2004/001326
§ 371 (c)(1),
(2), (4) Date: Nov. 1, 2005

(87) PCT Pub. No.: WO2004/100455
PCT Pub. Date: Nov. 18, 2004

(65) Prior Publication Data
US 2007/0036095 A1 Feb. 15, 2007

(30) Foreign Application Priority Data

May 5, 2003 (EP) .................................. 03101235

(51) Int. Cl.
*H04B 1/44* (2006.01)
(52) U.S. Cl. ...................... 370/282; 370/462; 710/124
(58) Field of Classification Search .................. 370/282, 370/431, 438, 439; 714/43, 4, 56
See application file for complete search history.

(56) References Cited

U.S. PATENT DOCUMENTS

| 5,528,168 | A | * | 6/1996 | Kleveland | 326/30 |
| 5,680,554 | A | * | 10/1997 | Baek | 710/107 |
| 5,706,289 | A | * | 1/1998 | Riley | 370/438 |
| 6,918,068 | B2 | * | 7/2005 | Vail et al. | 714/56 |
| 6,996,115 | B1 | | 2/2006 | Budde et al. | |
| 7,103,805 | B2 | * | 9/2006 | Belschner et al. | 714/43 |
| 2003/0067873 | A1 | | 4/2003 | Fuhrmann et al. | |
| 2003/0154427 | A1 | | 8/2003 | Hermann et al. | |

FOREIGN PATENT DOCUMENTS

| DE | 19950433 A1 | 4/2001 |
| EP | 1 280 024 A1 | 1/2003 |
| WO | 01/13230 A1 | 2/2001 |

OTHER PUBLICATIONS

Temple, C. "Avoiding the Babbling-Idiot Failure in a Time-Triggered Communication System", Fault Tolerant Computing 1998, 10 pgs.

* cited by examiner

*Primary Examiner* — Nittaya Juntima
*Assistant Examiner* — Henry Baron

(57) ABSTRACT

A network node (1) with a communication unit (2), which is provided for the implementation of a communication protocol for the purpose of communication with other network nodes via a communication medium (5), and with a bus monitor (3), which, mutually independently, each implement an access time schedule contained in a configuration data record, and which each make available, in accordance with the access time schedule, a release signal for a bus driver (4) provided in the network node (1), which evaluates these two signals and, in the event that the two release signals do not coincide, blocks the access of the network node (1) to the communication medium (5).

20 Claims, 1 Drawing Sheet

ERROR DETECTION AND SUPPRESSION IN A TDMA-BASED NETWORK NODE

The invention relates to a network node with a communication unit, which is provided for the implementation of a communication protocol for the purpose of the communication of the network node with other network nodes via a communication medium, and with a bus monitor.

Communication systems with multiple network nodes are frequently designed to be time-triggered. In systems of this kind, an individually, exclusively assigned time slot is in each case provided for the exchange of messages between various network nodes. As a result, the collision-free exchange of messages in error-free operation is ensured. This method is generally known as the TDMA (Time Division Multiple Access) method. A configuration of this kind is frequently provided for the exchange of messages in safety-critical applications, for instance in motor vehicles.

By means of a corresponding configuration of the bus monitor, the latter can, in accordance with the access time schedule, determine time slots for which a transmission involving the particular network node is permitted. For the remaining time periods, the network node is blocked on the transmission side. It can thereby be prevented that a defectively-operating network node transmits at times at which no transmission time slot is assigned to it, i.e. at which it should not have transmitted.

It is thereby possible to prevent a defectively-transmitting network node of this kind from blocking a network.

In some applications, however, there is a requirement not just to prevent a defectively-operating network node from accessing the network outside of the time slots assigned to it, but also to detect that the node is operating defectively. To this end, the bus monitors of network nodes are, in known systems, designed in such a way that an error-detection function is also realized within them. The bus monitor hereby compares the occurrence of a transmission request by the communication unit with the current position in the own access schedule. If it is established by the bus monitor that a transmission request is present at a time for which the access time schedule of the assigned network node does not specify any transmission, the bus monitor communicates this error state to a higher-order control unit. In addition, the system may be designed in such a way that the access of the network node to the network is blocked on the transmission side as a result of a discrepancy between the access time schedules of the communication unit and the bus monitor having been established by the bus monitor.

In these circumstances, simply from the fact that the communication unit passes on the control signal indicating a transmission request to both the bus driver and the bus monitor, many different vulnerable points open up for possible impairment of the system behavior resulting from the influence of errors.

For monitoring purposes, the bus monitor uses the control signal of the communication unit that is also passed on to the bus driver. If the bus monitor is operating defectively, this control signal may itself be faulty, and a defective transmission request may be routed by the bus monitor to the bus driver, leading to the activation of the bus driver, i.e. to media access.

It must further be ensured, in the case of a bus monitor that itself takes on part of the error detection, that the bus monitor performs its function at all times, or at least that a function failure is detected.

It is an object of the invention to specify a network node of the above-mentioned type in which, in addition to error suppression, error detection also takes place as reliably as possible.

This object is achieved in accordance with the invention by means of the features as claimed in claim 1:

A network node with a communication unit, which is provided for the implementation of a communication protocol for the purpose of communication with other network nodes via a communication medium, and with a bus monitor, which, mutually independently, each implement an identical access time schedule contained in a configuration data record, and which each make available, in accordance with the access time schedule, a release signal for a bus driver provided in the network node, which evaluates these two signals and, in the event that the release signals do not coincide, blocks the access of the network node to the communication medium.

In the network node in accordance with the invention, a communication unit, a bus driver and a bus monitor are provided. The communication unit serves for implementing a communication protocol, in accordance with which the communication with other network nodes that are coupled together via a communication medium is possible. The bus monitor represents an independent entity, which makes available a second item of information concerning the access time schedule. In addition to its function as a physical network connection, the bus driver constitutes a third entity for consistency checking between the access behavior of the communication unit and the bus monitor.

In the network node in accordance with the invention, the communication unit and the bus monitor, which are both externally configurable, are loaded with a configuration data record. From the configuration data record can be derived, inter alia, an access time schedule, which specifies, for the network node in which the communication unit and the bus monitor are provided, time slots in which this network node may access the communication medium. During the remainder of the time, the network node may not access the communication medium, i.e. may not transmit.

This mechanism is provided in order to ensure that only one network node is ever active in a network at a particular time, i.e. occupying the communication medium with a transmission procedure.

The access schedule contained in the configuration data record is implemented in both the communication unit and the bus monitor, independently of each other. By contrast with the solution known from the prior art, both the communication unit and the bus monitor, independently of each other, supply a release signal, which indicates the times at which the network node in which the two units are provided may be active, i.e. may transmit, in accordance with the access time schedule. These two release signals are always redundant, as a result of which an additional error security is achieved.

The evaluation of the two release signals is undertaken in the bus driver to which these two signals are made available. The bus driver evaluates both signals. Assuming that the network node is operating correctly, the release signals should always be both active or both non-active. In this case, no error state exists. If, however, the two release signals do not match, an error state exists. In this case, the bus driver blocks the access of the network node to the communication medium.

Through this concept of the network node in accordance with the invention, the component within the network node, namely the bus driver, which also undertakes the physical interfacing of the network node with the communication medium, is also included in the error detection. The network node in accordance with the invention thus detects a defective access in the bus driver, which is the location within the network node at which the appropriate measures must also be initiated in the event of an error. It is thereby ensured that, in the event of an error, even if the communication unit or the bus monitor are operating defectively, the original function of error detection and treatment, i.e. the blocking of any access by the network node to the communication medium, is safeguarded.

In accordance with an embodiment of the invention as claimed in claim 2, the communication unit can supply, in addition to the above-described release signal, a transmission request signal to the bus driver, which activates its transmission stage only if no blockage is present as a result of the evaluation of the two release signals. Access to the communication medium is thereby in fact only initiated if a transmission request by the communication unit is also present. A transmission request of this kind can, however, lead to activation of the transmission stages only if the evaluation of the two release signals has revealed no errors.

The two release signals can advantageously, as provided in accordance with a further embodiment of the invention as claimed in claim 3, be coded inversely to one another. The influence of a common mode error can hereby be suppressed for the error detection. The release signals are further checked in the bus driver for the consistency of the release information contained within them, wherein the special coding now has to be observed.

As a result of the implementation of the access time schedule in two different units, small time shifts or jitters may occur. In order to exclude influences of this kind during error detection, in accordance with a further embodiment of the invention as claimed in claim 4, a low-pass filter is used during the evaluation of the two release signals to suppress short-term differences between the two release signals, so that differences of this kind do not lead to error detection.

In accordance with a further embodiment of the invention as claimed in claim 5, a low-pass filter of this kind may, advantageously, be of configurable design in order that the permitted offset of the two release signals, or their jitter, can be configurable.

In accordance with a further embodiment of the invention as claimed in claims 6 and 7, the detection of state generated in the bus driver may be signaled to the outside, for example to a higher-order control unit of the network node in question. An error-state detection of this kind, signaled to the outside, may advantageously also be resettable from the outside in order to put the network node back into operation.

The above-described network node may advantageously be provided in a network in which multiple network nodes communicate with each other via the communication medium. An individual access time schedule is then provided for each network node, so that only one network node at a time has active access to the communication medium, i.e. is able to transmit.

A network of this kind may advantageously, in accordance with a further embodiment of the invention as claimed in claim 10, be designed in such a way that it is equipped with redundant network channels. In this case, a bus monitor and a bus driver are assigned to each network channel in each network node, so that error detection can take place individually for each transmission channel.

The invention will be further described with reference to examples of embodiments shown in the drawings, to which, however, the invention is not restricted.

Figure 1:
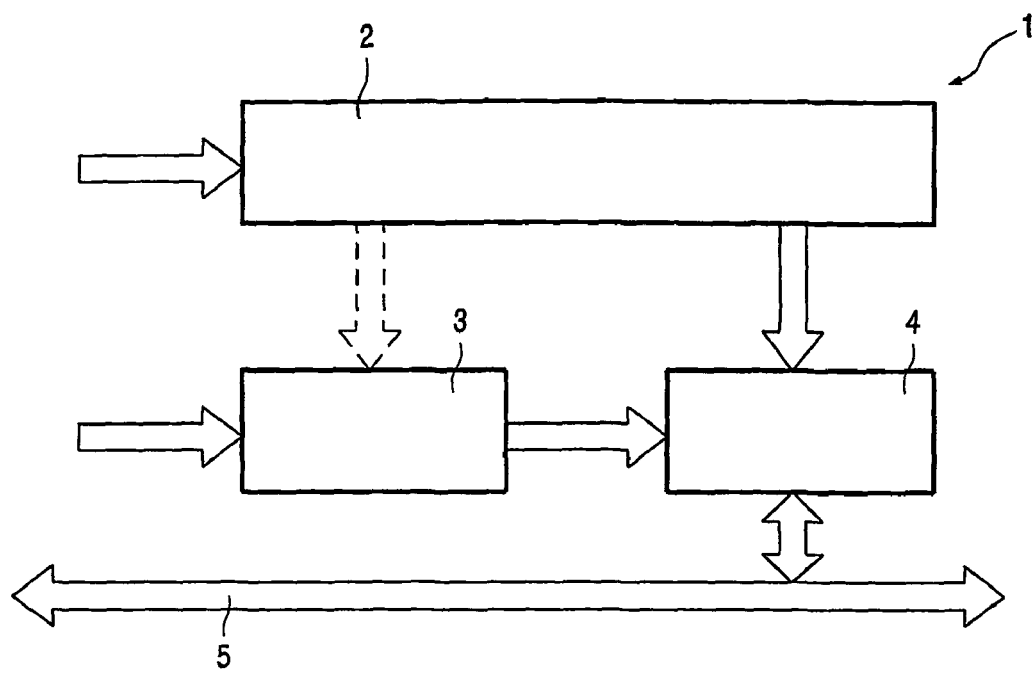
FIG. 1 shows a block circuit diagram of a network node in accordance with the invention.

FIG. 1 shows a block circuit diagram of a network node 1 in accordance with the invention, with a communication unit 2. In addition to the communication unit 2, a bus monitor 3 is provided.

Both the communication unit 2 and the bus monitor 3 are configurable from outside with configuration data records.

A bus driver 4 is also provided, by means of which access to a communication medium 5 is possible. Via the communication medium 5, the network node 1 may be coupled with other network nodes, not shown in the Figure.

The communication unit 2 is primarily provided in order to implement a communication protocol. A communication protocol of this kind controls the nature of the communication of the network node 1 with other network nodes via the transmission medium 5.

In a communication protocol of this kind, it may be, for example, that only specific time slots are provided for each network node in which it can access the communication medium 5. Outside of these time slots, the network node is not allowed to actively access the communication medium 5, i.e. outside of the times assigned to it in accordance with the access time schedule, the network node is not able to occupy the communication medium 5 with a transmission activity.

This access time schedule is contained, within the network node 1 in accordance with the invention, in a configuration data record which has been sent externally to both the communication unit 2 and the bus monitor 3. The communication unit 2 and the bus monitor 3 implement this access time schedule independently of one another, i.e. for each current moment, they establish whether or not the network node 1 may actively access the transmission medium 5. Both the communication unit 2 and the bus monitor 3 supply corresponding release signals to the bus driver 4. Only if these release signals match is it ensured that the network node 1 is able to access the communication medium 5 in accordance with the access time schedule. If, on the other hand, the two release signals are not identical, the bus driver 4 blocks the access of the network node to the communication medium 5, since an error is present in this case. An error of this kind may have various causes; what is crucial for the bus driver is that it is no longer ensured that the communication unit 2 and the independent bus monitor 3 are supplying consistent release information.

As the bus driver 4 is the unit in the network node 1 that directly accesses the communication medium 5, it is ensured by this embodiment of the network node that the unit having direct access to the communication medium 5 undertakes both the error detection and also blocks access in the event of an error. Further error sources are thereby excluded during error detection by the communication or interaction between multiple units.

Figure 2:
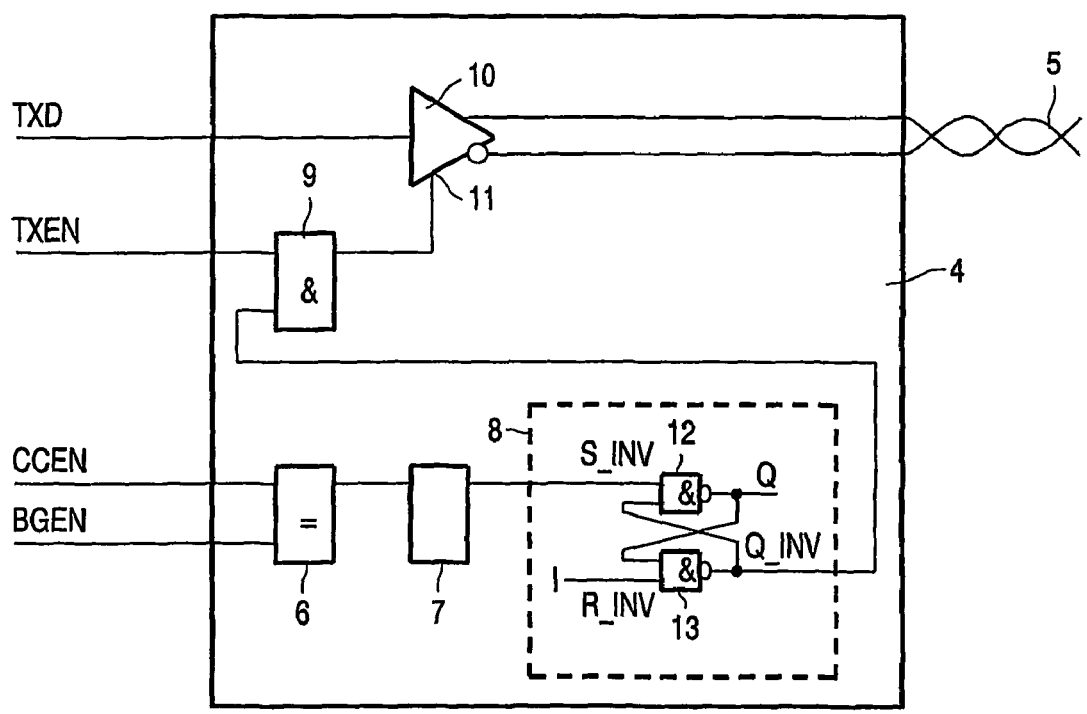
FIG. 2 shows a circuit diagram of a bus driver of the network node as shown in FIG. 1.

FIG. 2 shows as an embodiment example, a detailed circuit diagram of the bus driver 4 of the network node 1 as shown in FIG. 1.

Provided in the bus monitor 4, as shown in FIG. 2, is a comparison stage 6, to which, on the one hand, the release signal BGEN supplied by the bus monitor 3, not shown in FIG. 2, is sent. Further sent to the comparison stage 6 is the release signal CCEN of the communication unit 2 as shown in FIG. 1.

Because the communication unit 2 and the bus monitor 3 of the network node 1 as shown in FIG. 1 may possibly operate with small time displacements, or because jitter may possibly occur in their release signals BGEN and CCEN, an error may, in the short term, be signaled in the output signal of the comparison stage 6 despite the fact that no error in fact exists. In order to exclude time-displacement or jitter influences of this kind, connected downstream of the comparison stage 6 is a low-pass filter 7, which suppresses these short-term erroneous error messages. The low-pass filter 7 may advantageously be of variable design in respect of its filtering function, in order to be able to undertake adaptation to different possible time displacements or jitters.

Having been filtered by the low-pass filter, the output signal of the low-pass filter 7 arrives at an error-state machine 8, which essentially comprises a flip-flop comprising two inverting AND gates 12 and 13 (known as an asynchronous RS flip-flop). Supplied to the 'set' input (S_INV) of the flip-flop is the low-pass-filtered output signal of the low-pass filter 7.

If states signaling an error occur in the output signal of the low-pass signal 7, the error-state machine 8, or, specifically, the flip-flop provided within it, is set.

Referred to the effects on the error-state machine 8, the output signal supplied by the comparison stage 6 of the bus driver 4 as shown in FIG. 2 is always inactive (logic level '1') when these two release signals are identical. In this case, there is no error. If a discrepancy is established between the two release signals BGEN and CCEN, the output signal of the comparison stage 6, referred to the effects on the error-state machine 8, is activated (logic level '0'), i.e. it signals an error.

For this embodiment example, it is assumed that the starting state (initial state) of the error-state machine 8 is such that a logic level '1' is present at the output Q_INV, i.e. no error has been detected. In an actual circuit realization, this must be ensured for an asynchronous flip-flop by appropriate activation of the reset input (R_INV), which is not shown in FIG. 2.

In the embodiment example shown in FIG. 2, the inverted output Q_INV of the error-state machine 8 is evaluated and sent to an input of an AND gate 9. Sent to the other input of the AND gate 9 is a transmission-request signal TXEN supplied by the communication unit 2 of the network node as shown in FIG. 1. Since the output signal of the error-state machine 8 is inverted, this signal has a high (logic '1') level in the error-free state, i.e. the transmission-request signal TXEN reaches the output of the AND gate 9. If, on the other hand, a case of error exists, the output signal of the error-state machine 8 has a low (logic '0') level, so that any transmission-request signals occurring are suppressed.

As a result, an activation level (logic '1') occurs at the output of the AND gate 9 only if, on the one hand, no error is present, but, on the other, the transmission-request signal TXEN signals that transmission is to take place. This signal arrives at a control input 11 of a transmission amplifier 10.

Sent to the transmission amplifier 10 on the input side is a data signal TXD, which is to be transmitted. To this end, the transmission amplifier is equipped with, for the differential line transmission, for example, a non-inverting and an inverting output, coupled with two lines of the communication medium 5.

On the basis of the above-described interrelationships, therefore, a transmission of data by the transmission amplifier 10 can take place only if no error is present and, on the other hand, a transmission request is given by the communication unit 2.

Owing to the design of the network node on the one hand and the error evaluation in the bus driver 4 of the network node 1 on the other, it is achieved that, in the particular unit of the network node 1 by means of which the active access to the communication medium takes place, namely in the bus driver 4, error evaluation also takes place. It is thereby directly in this unit that the error detection and the measure for suppression of further error propagation take place. In addition, owing to the independent implementation of the access time schedule in the communication unit 2 and the bus monitor 3, a redundancy is achieved in the evaluation.

The invention claimed is:

1. A network node comprising:
    a communication unit for the implementation of a communication protocol for communication with other network nodes via a communication medium,
    a bus monitor, and
    a bus driver, where
    the communication unit and the bus monitor each mutually independently implement an access time schedule contained in a configuration data record, and each make available, in accordance with the access time schedule, a release signal for the bus driver,
    the bus driver evaluates these two release signals and, in the event that the two release signals do not coincide in time, blocks the access of the network node to the communication medium.

2. A network node as claimed in claim 1, characterized in that the communication unit supplies, in addition, a transmission request signal to the bus driver, as a function of which the bus driver activates its transmission stage if no blockage of access to the communication medium is present.

3. A network node as claimed in claim 1, characterized in that the release signals of the communication unit and the bus monitor are coded inversely one another.

4. A network node as claimed in claim 1, characterized in that the evaluation of the two release signals is undertaken in the bus driver under the influence of a low-pass filter.

5. A network node as claimed in claim 4, characterized in that the low-pass filter is of configurable design.

6. A network node as claimed in claim 1, characterized in that error-state detection generated in the bus driver is resettable from the outside.

7. A network node as claimed in claim 1, characterized in that error-state detection generated in the bus driver is signaled to the outside.

8. A network node as claimed in claim 1, characterized in that the bus monitor and the bus driver are integrated into one unit.

9. A network with network nodes as claimed in claim 1, wherein the network nodes communicate with each other via a single communications link that consists of the communication medium.

10. A network as claimed in claim 9, in which redundant network channels are provided, wherein a bus monitor and a bus driver are assigned to each network channel in each network node.

11. A network node for communication with other network nodes via a communication medium, the network node comprising:
    a bus driver configured to evaluate two release signals for equality of the release information made available to it;
    two separate units provided in the network node, which, mutually independently, each implement an access time schedule to generate the release signal; and
    wherein, in the event that the release signals do not coincide in time, the bus driver is configured to block the access of the network node to the communication medium.

12. A network device for communicating with other network devices over a communications medium, the device comprising:
- a bus monitor to independently generate a release signal in response to a time schedule from a configuration data record, the time schedule specifying times at which each network device can exclusively communicate on the communications medium;
- a communication circuit to independently generate another release signal in response to the time schedule, and to implement a communication protocol for communication with the other network nodes via the communication medium;
- a bus driver to evaluate the independently-generated release signals and to block access to the communications medium in response to the evaluation indicating that the release signals do not coincide in time.

13. The device of claim 12, wherein
the network device communicates with said other network devices over a single communications medium, and
the bus driver evaluates the independently-generated release signals to ensure that both signals match one another to block a network access condition resulting from an improperly-generated release signal.

14. The device of claim 12, wherein
the communication circuit supplies a transmission request signal to the bus driver, and
the bus driver transmits over the communications medium in response to the transmission request signal and to the evaluation not indicating that the release signals do not coincide.

15. The device of claim 12, wherein the bus monitor and the communication circuit generate release signals that are coded inversely, relative to one another.

16. The device of claim 12, wherein the bus driver includes a low-pass filter that is used to evaluate the two release signals.

17. A network device for time-based communication with other network devices over a communications medium according to a time schedule configuration record that specifies times at which each network device can exclusively communicate on the communications medium, the network device comprising:
- a bus monitor configured to independently generate a release signal according to the time schedule;
- a communication circuit configured to independently generate another release signal according to the time schedule, and to implement a communication protocol for communication with the other network nodes via the communications medium; and
- a bus driver configured to
  - evaluate the timing of both of the independently-generated release signals, and
  - block the network device from accessing the communications medium in response to the evaluation indicating that the release signals do not coincide in time.

18. The device of claim 17, wherein
the network device communicates with said other network devices over a single communications medium,
the communication circuit is configured to supply a transmission request signal to the bus driver, and
the bus driver is configured to transmit over the communications medium in response to the transmission request signal, in response to the evaluation indicating that the release signals do not coincide in time.

19. The device of claim 17, wherein the bus monitor and the communication circuit respectively generate release signals that are coded inversely, relative to one another.

20. The device of claim 17, wherein the bus driver includes a low-pass filter and is configured to evaluate the timing of both of the independently-generated release signals using the low-pass filter to suppress short-term time differences between the two release signals, and to determine that the independently-generated release signals coincide in time based upon the suppressed short-term time differences.

* * * * *